(12) United States Patent
Wabnegger

(10) Patent No.: US 9,197,041 B2
(45) Date of Patent: Nov. 24, 2015

(54) METHOD AND APPARATUS FOR PROVIDING TEMPORARY SUPPORT AND A MEANS FOR RELOCATING ENERGIZED ELECTRICAL CONDUCTORS

(75) Inventor: David Wabnegger, Keremeos (CA)

(73) Assignee: QUANTA ASSOCIATES, L.P., Houston, TX (US)

( * ) Notice: Subject to any disclaimer, the term of this patent is extended or adjusted under 35 U.S.C. 154(b) by 458 days.

(21) Appl. No.: 13/810,634

(22) PCT Filed: Jul. 21, 2011

(86) PCT No.: PCT/CA2011/000902
§ 371 (c)(1),
(2), (4) Date: Jan. 16, 2013

(87) PCT Pub. No.: WO2012/009806
PCT Pub. Date: Jan. 26, 2012

(65) Prior Publication Data
US 2013/0134369 A1    May 30, 2013

Related U.S. Application Data

(60) Provisional application No. 61/344,432, filed on Jul. 21, 2010.

(30) Foreign Application Priority Data

Jul. 21, 2010  (CA) ........................... 2710631

(51) Int. Cl.
*H02G 1/02* (2006.01)
*H02G 1/04* (2006.01)
*H02G 7/05* (2006.01)

(52) U.S. Cl.
CPC . *H02G 1/02* (2013.01); *H02G 1/04* (2013.01); *H02G 7/05* (2013.01)

(58) Field of Classification Search
CPC ............. H02G 1/00; H02G 1/02; H02G 1/04; H02G 1/08–1/10; H02G 7/00; H02G 7/05; H02G 7/053
USPC ........................... 254/4 R, 4 C, 4 B, 134.3 PA
See application file for complete search history.

(56) References Cited

U.S. PATENT DOCUMENTS

| | | | |
|---|---|---|---|
| 1,235,999 A | 8/1917 | Neeley | |
| 3,064,824 A * | 11/1962 | Beatty | ............................ 212/179 |
| 3,104,399 A * | 9/1963 | Dalton | ............................ 4/562.1 |

(Continued)

*Primary Examiner* — Lee D Wilson
*Assistant Examiner* — Tyrone V Hall, Jr.
(74) *Attorney, Agent, or Firm* — Antony C. Edwards

(57) ABSTRACT

A temporary support and conductor re-locator includes a mounting arm and corresponding mounting bracket on one end of the arm, the other end supporting a pivotally mounted insulator depending downwardly from a crank arm. The upper end of the crank arm is attached to an actuator which, upon actuation, pivots the crank arm and insulator about the end of the support arm so as to rotate up and out of the way an energized conductor contained in the wire holder at the bottom end of the insulator. The support arm is temporarily mounted to an existing transmission line tower or pole so as to extend outwardly substantially horizontally therefrom thereby cantilevering outwardly of the tower the end of the arm supporting the crank arm and insulator. Actuation of the actuator firstly elevates a lower portion of the crank arm then rotates the crank arm about the cantilevered end of the support arm.

19 Claims, 15 Drawing Sheets

(56) References Cited

U.S. PATENT DOCUMENTS

| | | | | |
|---|---|---|---|---|
| 3,753,508 A | * | 8/1973 | Carpenter | 414/680 |
| 3,866,759 A | * | 2/1975 | Lucas | 212/261 |
| 3,945,502 A | * | 3/1976 | Diener | 212/179 |
| 4,190,233 A | * | 2/1980 | Godfrey | 254/4 B |
| 4,432,691 A | * | 2/1984 | Sterner | 414/735 |
| 5,029,717 A | * | 7/1991 | Chambers et al. | 212/231 |
| 5,520,498 A | * | 5/1996 | DiBartolomeo | 414/680 |
| 5,538,207 A | * | 7/1996 | O'Connell et al. | 248/49 |
| 6,434,810 B1 | | 8/2002 | Pigott et al. | |
| 6,837,671 B2 | | 1/2005 | Devine et al. | |
| 7,216,850 B2 | * | 5/2007 | Kwon | 254/395 |
| 7,520,398 B1 | * | 4/2009 | Ledman | 212/179 |
| 8,226,069 B2 | * | 7/2012 | Devine et al. | 254/134.3 PA |
| 2003/0156936 A1 | * | 8/2003 | Devine et al. | 414/680 |
| 2008/0264650 A1 | * | 10/2008 | Begnaud et al. | 166/381 |

* cited by examiner

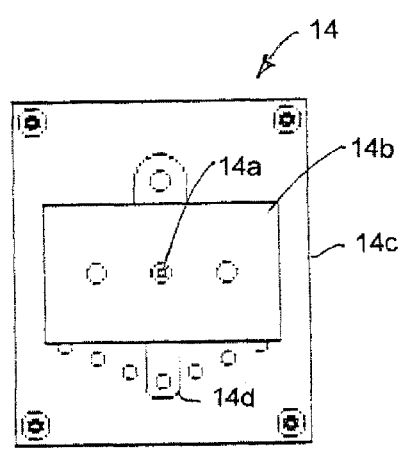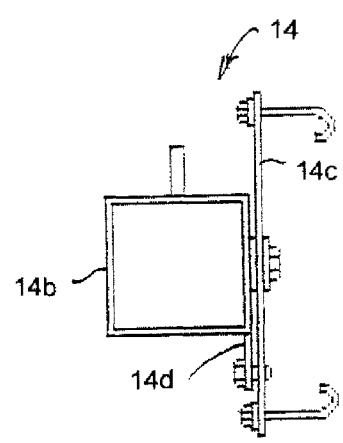
Fig 10a                                    Fig 10b

METHOD AND APPARATUS FOR PROVIDING TEMPORARY SUPPORT AND A MEANS FOR RELOCATING ENERGIZED ELECTRICAL CONDUCTORS

FIELD OF THE INVENTION

This invention relates to the field of methods and apparatus for the repair or replacement of high voltage power lines or the supporting structures, insulators and the like related to same, and in particular, to a manually actuable light weight device for mounting onto a high voltage line tower for the insulated acquisition and relocation of an energized electrical conductor supported by the tower.

BACKGROUND OF THE INVENTION

As recognized by Pigott et al in U.S. Pat. No. 6,434,810, which issued Aug. 20, 2002, for a Method for High Voltage Power Line Repair, high voltage power lines have been constructed to extend from spaced towers high above terrain which is practically inaccessible to land vehicles so that in recent years a number of methods and devices have been developed to facilitate the repair of high voltage power lines by helicopter where such power lines are often suspended from each support tower by elongate insulators. Pigott et al describe that such repairs have been extremely difficult and time consuming to perform in the past in that the tension on the power line must be broken so that the line can be lifted out of its support shoe to facilitate the line repair and that in an attempt to alleviate this problem some line men have tried to winch the line upward from the crossbar at the top of the tower. Consequently, Pigott et al teach temporarily attaching a template to the yoke plate which supports a plurality of power lines so as to receive and position winch lines on opposite sides of the yoke plate directly above a power line. The winch lines are described as extending from the template to a hand winch, and from the hand winch two attachments with the power line on opposite sides of the yoke plate. The winch lines are described as extending downwardly to connections with the power line spaced outwardly on opposite sides of the yoke plate, and that the winch lines are used to draw the power line upwardly towards the yoke plate to raise the power line out of contact with the yoke plate.

Thus Pigott et al address generally the problem to which the present invention is addressed; namely, that, because maintenance and refurbishment of critical transmission and distribution lines often requires that the lines remain energized and operational during the maintenance procedures, that this requires that the conductors remain live while being temporarily relocated and remain thus insulated from ground and other conductors so as to provide a safe working zone when the energized conductor has been relocated so as to allow safe replacement of hardware, insulators in the working zone or the placement of new conductors. Pigott et al also address the problem addressed by the present invention, namely, that it is often impractical to move cranes or other ground based support vehicles adjacent to the tower or other energized conductor supporting structure so as to facilitate the support and relocation of the energized conductor to allow maintenance and refurbishment. Examples of ground based support vehicles and attachments to ground based support vehicles such as cranes are found for example in U.S. Pat. No. 5,538,207 which issued Jul. 23, 1996, to Devine et al for a Boom Mountable Robotic Arm, U.S. Pat. No. 6,837,671, which issued Jan. 4, 2005 to Devine et al for an Apparatus for Precisely Manipulating Elongate Objects Adjacent to and Such as Energized Overhead High Voltage Transmission Lines, and U.S. Pat. No. 7,535,132 which issued May 19, 2009 to Devine et al for a Live Conductor Stringing and Splicing Method and Apparatus.

In the prior art applicant is also aware of U.S. Pat. No. 1,235,999, which issued Aug. 7, 1917 to Neeley for a Repair Device for High Voltage Electric Transmission Lines. Neeley describes a device adapted to be utilized by workmen for replacing broken or damaged insulators which carry overhead electric conductors and for effecting an immediate attachment of the line wires to the insulators, even though the wires are alive or charged with current. By way of background, Neeley states that overhead lines for conducting electricty generally embody a support consisting of a pull and one or more cross arms, insulators applied to the cross arm at opposite sides of the pole, and live wires attached through the medium of the insulators to the support, and that an important feature in the repairing or upkeep of such lines resides in the renewal or replacement of such of the insulators as may become broken or otherwise damaged. To provide for this, Neeley discloses a repair device for high voltage electric transmission lines which includes a saddle adapted to be adjustably positioned on a cross arm, a pin removably seated in the lower portion of the saddle for retaining the saddle on the cross arm, a loop pivotally connected to the pin to one side of the saddle, a lever carried by the loop, an insulator carried by one end of the lever, and a wire engaging member on the insulator.

SUMMARY OF THE INVENTION

The present invention is directed to the problem presented to line men who are required to maintain or refurbish transmission and distribution lines which must remain energized but without the use of ground-based support vehicles and prior art manipulator attachments due to the terrain or due to the encroachment or abandonment of necessary rights of way adjacent to the effected transmission line towers. The solution according to the present invention is to support one energized conductor whether for example it be a single phase, a single bundle or the like, to pick it and to clear the single conductor out of the work zone, that is out of the way of the area where the line men must perform the maintenance or refurbishment, and in particular, to provide a relatively lightweight, for example, manufactured of aluminium, elongate rigid mounting arm and corresponding mounting bracket on one end of the arm, the other end supporting a pivotally mounted insulator depending downwardly from a crank arm, wherein the upper end of the crank arm is attached to an actuator which, upon actuation, pivots the crank arm and insulator about the end of the support arm so as to rotate up and out of the way a energized conductor contained in the wire holder at the bottom end of the insulator. The support arm is temporarily mounted to an existing transmission line tower or pole (collectively herein a tower) so as to extend outwardly substantially horizontally therefrom thereby cantilevering outwardly of the tower the end of the arm supporting the crank arm and insulator.

In one embodiment of the present invention, a lower end of the crank arm, to which the insulator is mounted, is telescopic so as to be telescopically retractable up into and telescopically extendable downwardly from, the upper end of the crank arm, wherein the actuator employed to rotate the crank arm may also be employed to telescopically actuate the lower end of the crank arm relative to the upper end.

Thus for example where the actuator is a tensioning device such as a hydraulic actuator, screw drive, winch or the like, tensioning one end of a cable or other flexible elongate member, the opposite end of the cable may act on the lower end of the crank arm so that, upon initial tensioning of the cable, firstly the lower end of the crank arm is telescopically elevated relative to the upper end of the crank arm, and, secondly, once the lower end of the crank arm is elevated then further tensioning of the cable, or in an alternative embodiment where further tensioning of the cable engages a second tensioning member affixed to the upper end of the crank arm, draws the upper most end of the upper crank arm towards the support arm so as to thereby pivot the crank arm about the cantilevered end of the support arm. In one embodiment selectively actuable brake, or lock-out or other form of rotation inhibitor may be provided acting on the crank arm so as to inhibit rotation of the crank arm until after the lower end of the crank arm has been telescopically retracted.

The initial upward telescopic translation of the lower part of the crank arm also thereby elevates the generally vertically disposed insulator and the wire holder mounted to the bottom of the insulator. When the energized conductor is held within the wire holder, the loading due to the weight of the conductor on the insulator to be replaced for example, is relieved. Once the energized conductor has been uncoupled from the old insulator, that is from the insulator requiring repair/replacement, the rotation of the crank arm and insulator will carry the energized conductor in the wire holder in a circular arc about the pivot point of the crank arm on the cantilevered end of the support arm to thereby rotate and elevate the energized conductor out of the work zone. The present invention is intended to include the corresponding method of operating the apparatus.

BRIEF DESCRIPTION OF THE DRAWINGS

FIG. 10a is, in enlarged view, the mounting bracket of FIG. 1.

FIG. 10b is, in right side elevation view, the mounting bracket of FIG. 10a.

FIG. 12a is, in side elevation view, a further embodiment of the temporary support apparatus of FIG. 11a.

DETAILED DESCRIPTION OF EMBODIMENTS OF THE INVENTION

Figure 1:
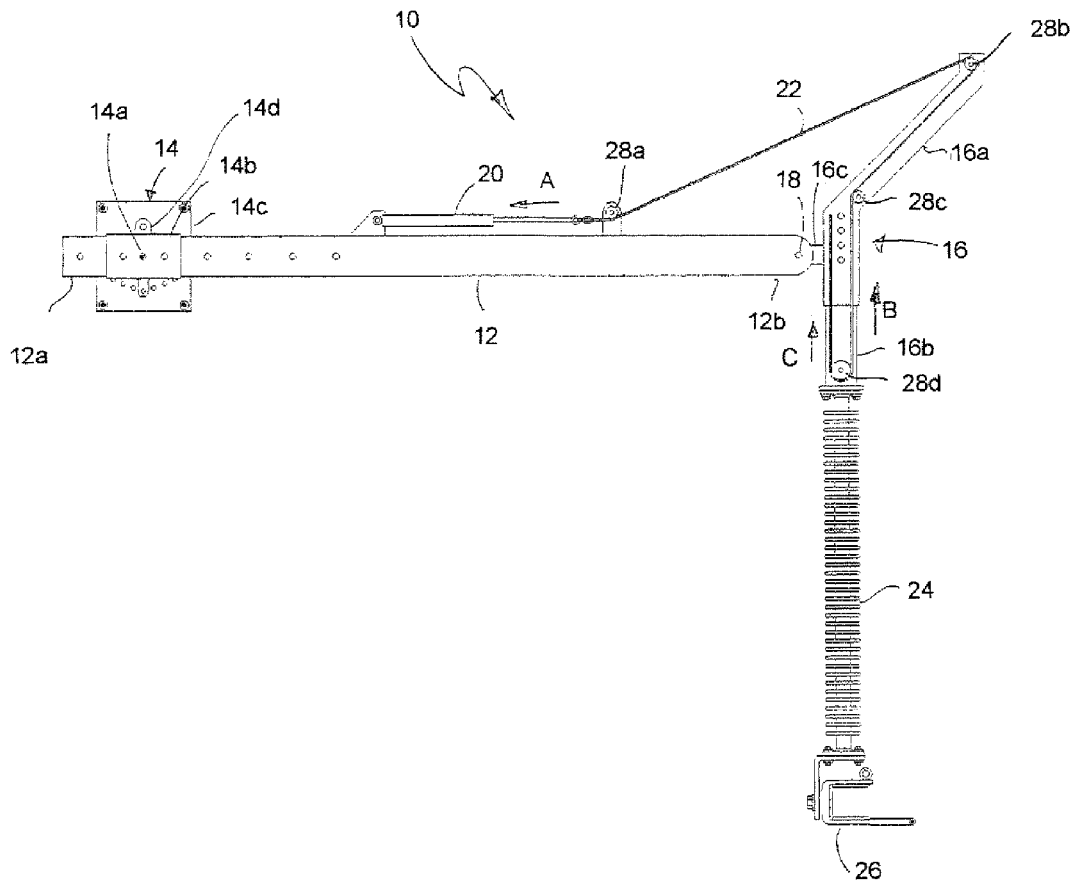
FIG. 1 is, in front elevation view, the complete temporary support apparatus for supporting energized conductors according to one embodiment of the present invention.

As seen in the accompanying drawings wherein similar characters of reference denote corresponding parts in each view, the temporary support apparatus 10 for providing temporary support to an energized conductor and a means for relocating the energized conductor out of a work zone includes a support arm 12 having a base end 12a and a cantilevered end 12b. A mounting bracket 14 better seen in FIGS. 10a and 10b is adjustably mounted onto base end 12a. A crank arm 16 is pivotally mounted at pivot 18 to cantilevered end 12b. Crank arm 16 includes in particular an upper crank arm 16a and a lower crank arm 16b. An actuator 20 is mounted to support arm 12, to actuate rotation of crank arm 16 about pivot 18 by tensioning either cable 22 alone, or in the alternative embodiment described below by tensioning specifically cable 22 and linkage 40. An insulator 24 and corresponding wire holder 26 mounted to, so as to depend downwardly from, lower crank arm 16b.

Mounting bracket 14 is adjustable in position along the length of base end 12a of support arm 12 by the use of a removable fastener, such as pin 14a mounted through apertures formed in a slide collar 14b through which is snugly and slidably journalled base end 12a. Base end 12a includes a spaced apart array of apertures which, depending on the position to which collar 14b is slid, may be aligned with the aperture in collar 14b through which pin 14a is placed so that pin 14a registers with one of the apertures along base end 12a to thereby provide for locking the position of mounting bracket 14 relative to support arm 12.

Collar 14b may be pivotally mounted onto base plate 14c by means of a pivot arm 14d pivotally mounted at for example an upper end thereof so as to allow the rotation of the opposite end of pivot arm 14b to thereby adjust the angle of the base plate relative to base end 12a.

Actuator 20 may be a linear actuator such as a hydraulic actuator, screw or winch for example or other selectively or manually operable tensioning device. In the embodiment of FIGS. 1-7 cable 22 passes under pulley 28a mounted on support arm 12 between actuator 20 (not shown to scale) and the distal end of cantilevered end 12b, and over pulley 28b mounted on the upper most end of upper crank arm 16a, and around pulley 28c which is mounted on upper crank arm 16a aligned vertically over lower crank arm 16b. Cable 22 passes around pulley 28d mounted at the lower end of lower crank arm 16b. Cable 22 returns upwardly to where it is attached to upper crank arm 16a for example, mounted vertically above lower crank arm 16b. A tensioning actuation by actuator 20 in direction A thereby tensions cable 22 around the pulleys 28a-28d to impart an elevating tension in direction B thereby urging the vertical translation of lower crank arm 16b telescopically upwardly in direction C into the female receiving tube within the lower most end of upper crank arm 16a.

Because insulator 24 and wire holder 26 are rigidly mounted to, so as to depend vertically downwardly from, the lower most end of lower crank arm 16b, upward translation in direction C of lower crank arm 16b thereby correspondingly also elevates insulator 24 and wire holder 26 correspondingly.

Figure 2:
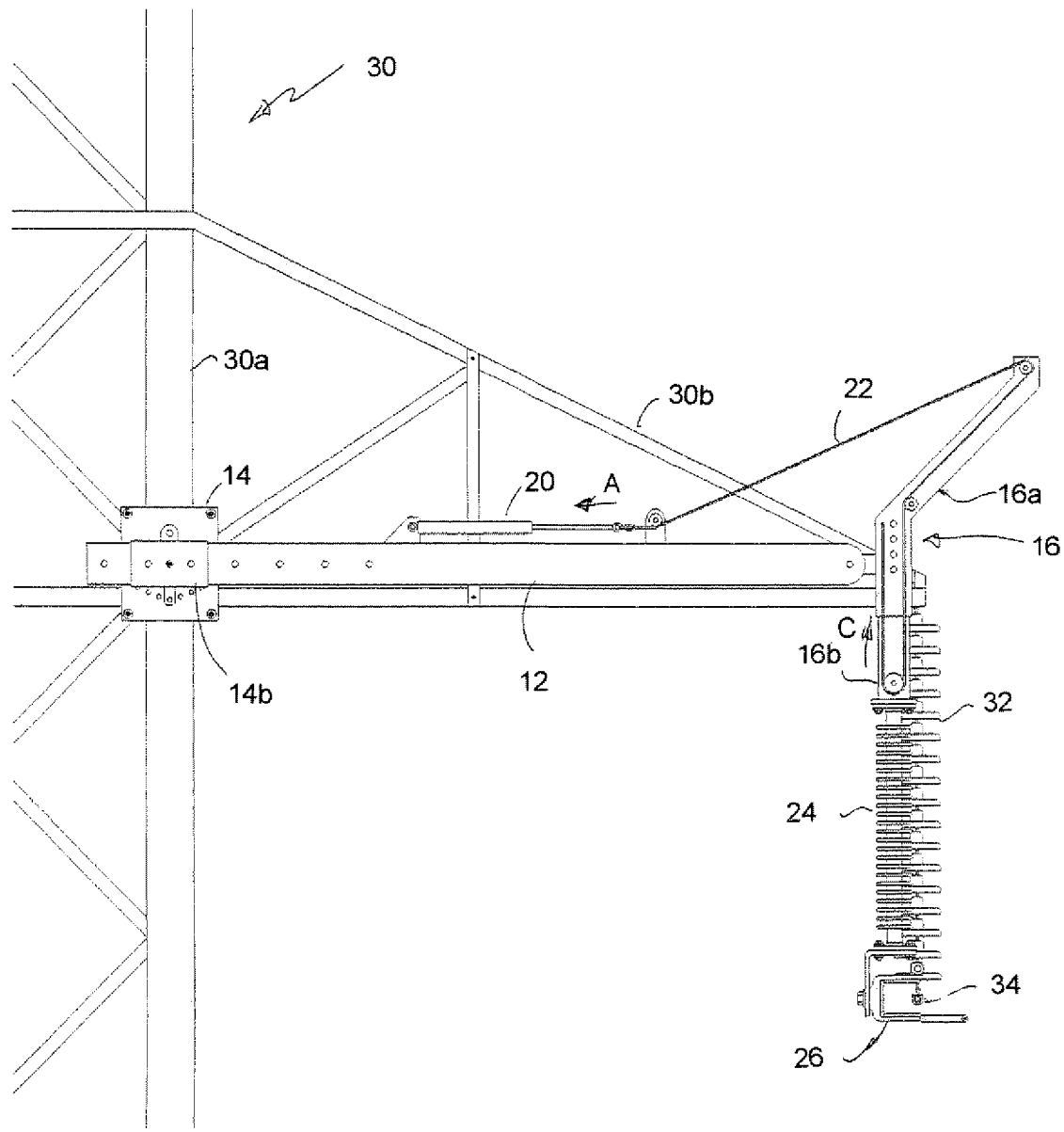
FIG. 2 is, in front elevation view, the temporary support apparatus of FIG. 1 mounted onto a vertical support of a transmission line tower so as to extend cantilevered outwardly along a cross arm of the tower.
Figure 3:
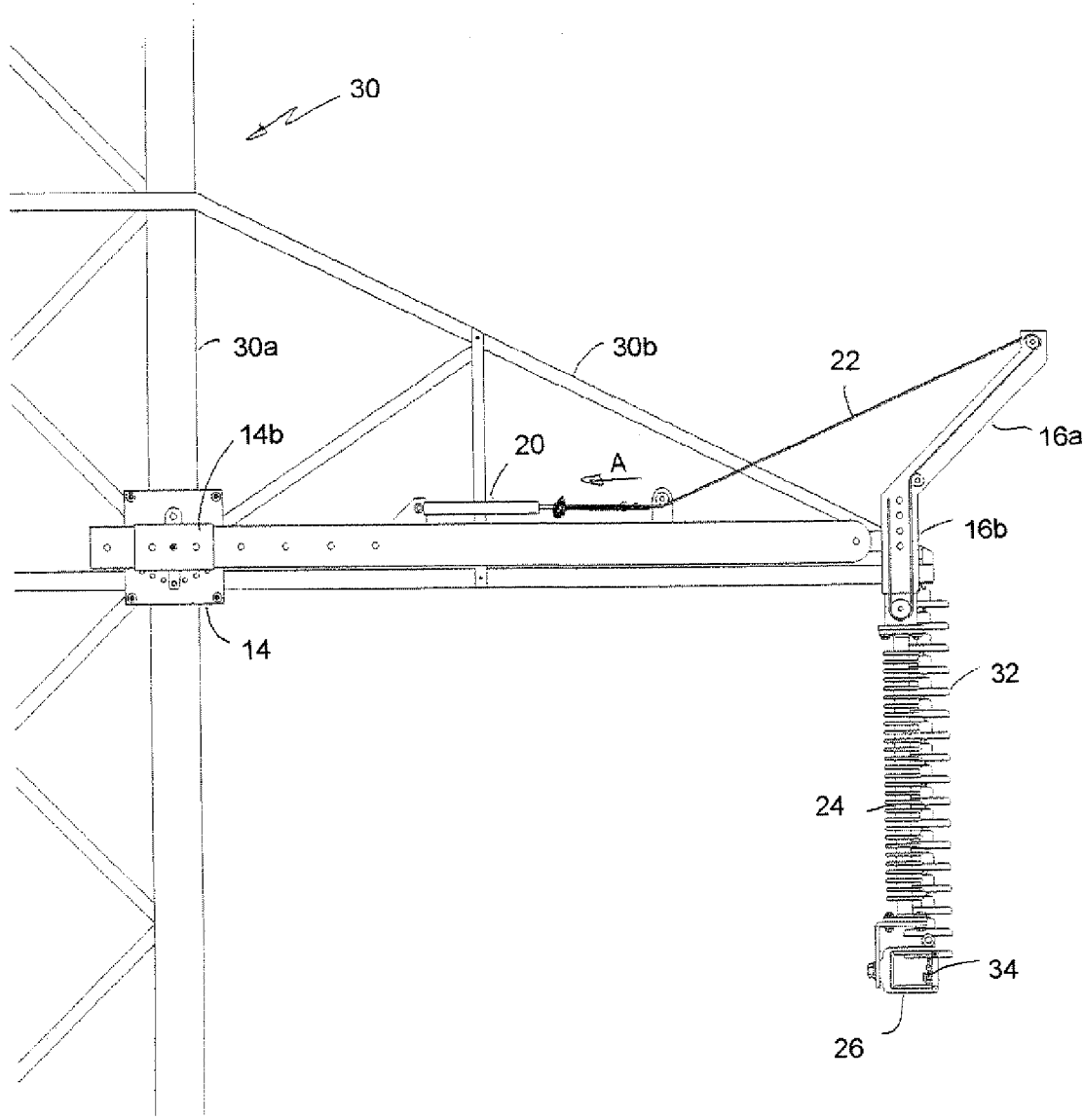
FIG. 3 is the view of FIG. 2 with the insulator of the temporary support apparatus elevated so as to support the weight of the conductor captured in the wire holder at the bottom of the insulator.
Figure 4:
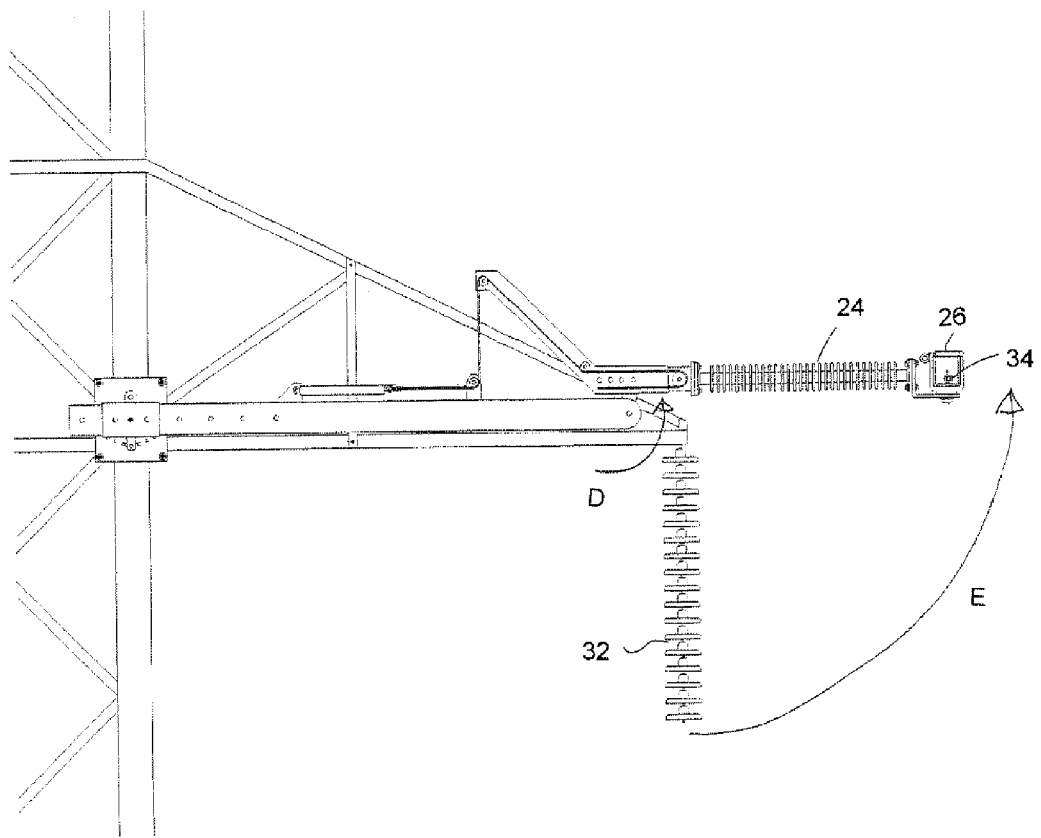
FIG. 4 is, in front elevation view, the temporary support apparatus of FIG. 3 actuated so as to pivot the crank arm, insulator and wire holder about the cantilevered end of a support arm of the apparatus so as to thereby elevate the conductor captured within the wire holder.
Figure 5:
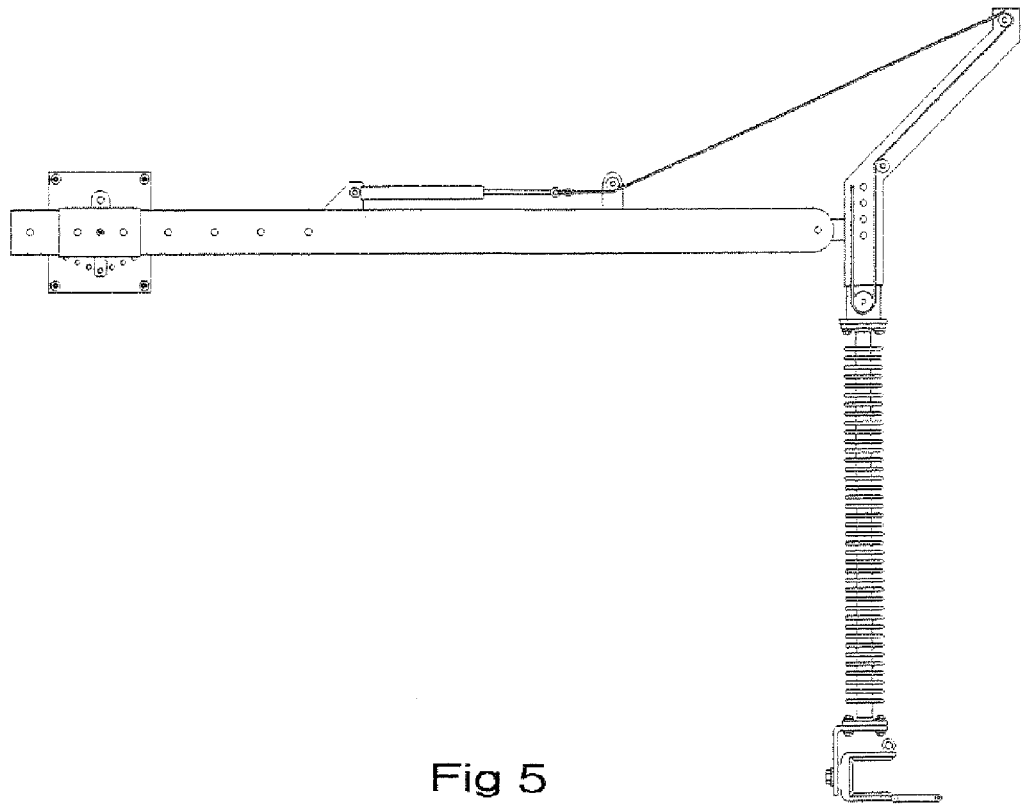
FIG. 5 is the temporary support apparatus in its actuated position as shown in FIG. 3.
Figure 6:
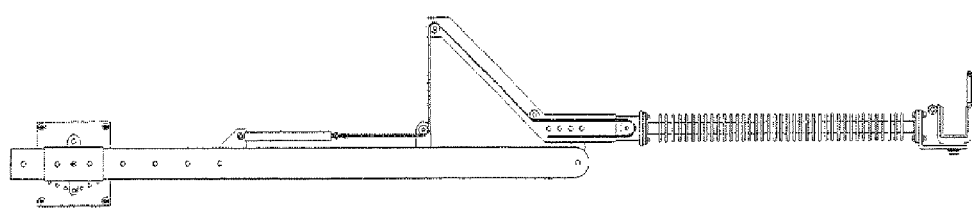
FIG. 6 is the temporary support apparatus in its actuated position of FIG. 4.

As seen in FIGS. 2-4, where the temporary supporting apparatus 10 of FIG. 1 has been mounted onto an upright member 30a of a transmission tower 30, it may be seen that in particular mounting bracket 14 is rigidly fastened onto upright member 30a, and support arm 12 translated horizontally outwardly of mounting bracket 14 and then locked into position within slide collar 14b so as to position crank arm 16, insulator 24 and wire holder 26 adjacent, respectively, the outer most end of cross arm 30b. Old insulator 32 is mounted to the distal end of cross arm 30b. Energized conductor 34 is mounted to the lower most end of insulator 32. With energized conductor 34 captured in wire holder 26 as seen in FIG. 3, actuation of actuator 20 so as to tension cable 22 in direction A again elevates lower crank arm 16b in direction C upwardly telescopically into the lowermost hollow end of upper crank arm 16a thereby lifting conductor 34 in wire holder 26 to take up and support the weight of conductor 34 thereby allowing insulator 32 to be uncoupled.

With conductor 34 uncoupled from insulator 32, further tensioning of cable 22 in direction A rotates crank arm 16 in direction D (see in FIG. 4) about pivot 18 as cable 22 becomes taught, that is once lower crank arm 16b has been elevated to the full extent of its travel, so that further tensioning of cable 22 pulls pulley 28b towards pulley 28a. The rotation of crank arm 16 in direction D thereby also rotates insulator 24 from its downward vertical position into a raised or elevated for example substantially horizontal position thereby carrying conductor 34 in an upward circular arc E away from old insulator 32. This clears conductor 34 from the necessary work zone allowing the linemen, in this instance, to operate on old insulator 32. Once the refurbishment or replacement of old insulator 32 has been completed, actuator 20 is actuated oppositely from the raising operation, so as to allow cable 22 to extend from actuator 20 thereby allowing crank arm 16 to rotate to lower insulator 24, wire holder 26 and conductor 34 to a returned or fully lowered position corresponding to the original position of conductor 34 (as seen in FIG. 2), whereby conductor 34 may be recoupled onto a newly replaced insulator 32. Wire holder 26 is released from conductor 34 once lower crank arm 16b has been lowered to its fully lowered position by the complete detensioning of cable 22 and conductor 34 recoupled to the new insulator 32.

Figure 1A:
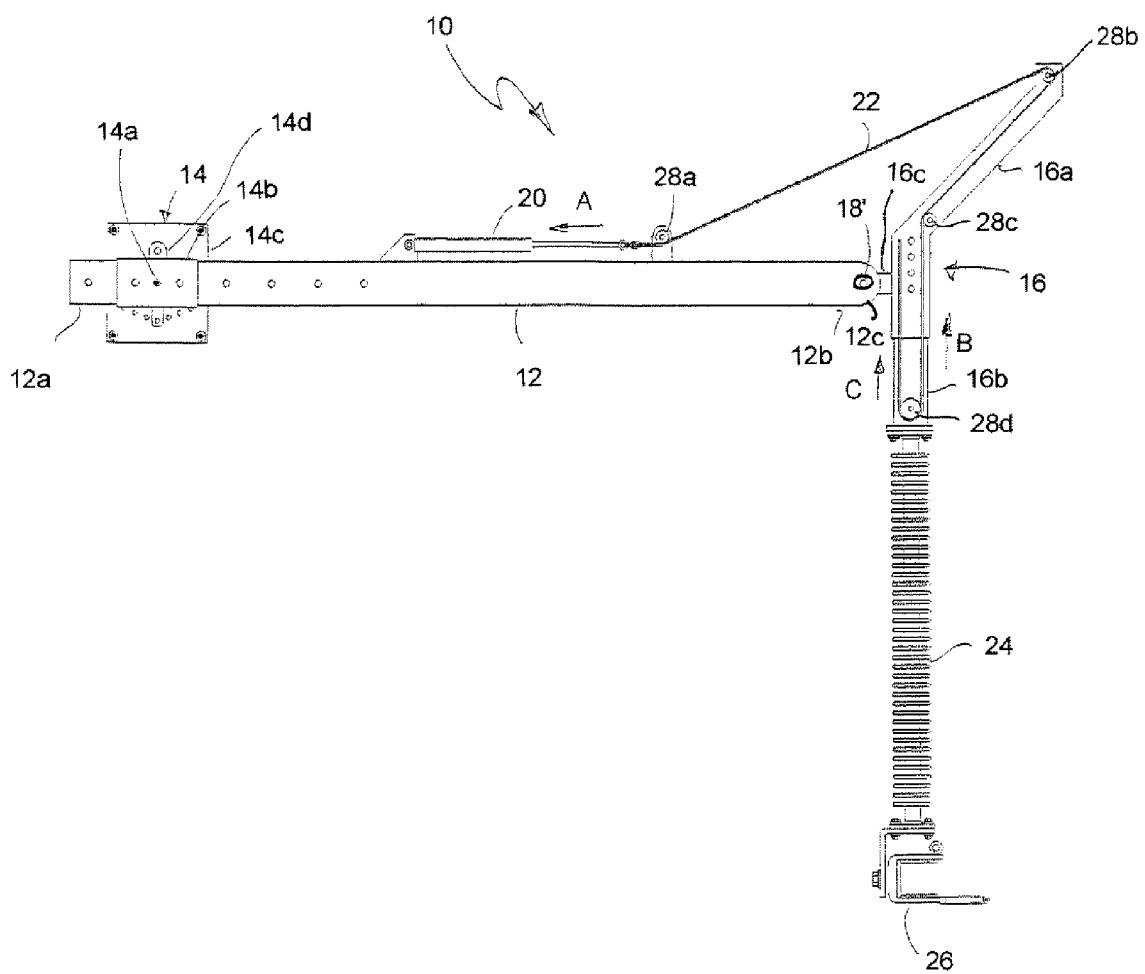
FIG. 1a is an alternative embodiment of the apparatus of FIG. 1.

In one alternative embodiment, as seen in FIG. 1a, a selectively operable brake is provided, such as by replacing the shaft of pivot 18 with a threaded bolt and mating nut 18' which may be selectively tightened to compress cantilevered end 12b, for example where end 12b is formed as a spaced apart pair of ears 12c sandwiching mounting arm 16c of crank arm 16 there between. Tightening nut and bolt 18' compresses the ears 12c together and increases the friction resisting rotation of mounting arm 16c and thus resisting the rotation in direction D of the entire crank arm 16. By selectively inhibiting the rotation of crank arm 16, the lower end 16b of the crank arm will retract in direction E upon tensioning of cable 22 before the crank arm rotates in direction D to thereby sequence the upward telescoping of lower and 16b. As would be known to one skilled in the art, the use of nut and bolt 18' as a selectively operable brake is just one example of how crank arm 16 may be restrained from rotation until after the lower end 16b has elevated, as other forms of brakes or lock-outs, such as by the use of locking pins, latches, etc, may be employed.

Figure 7:
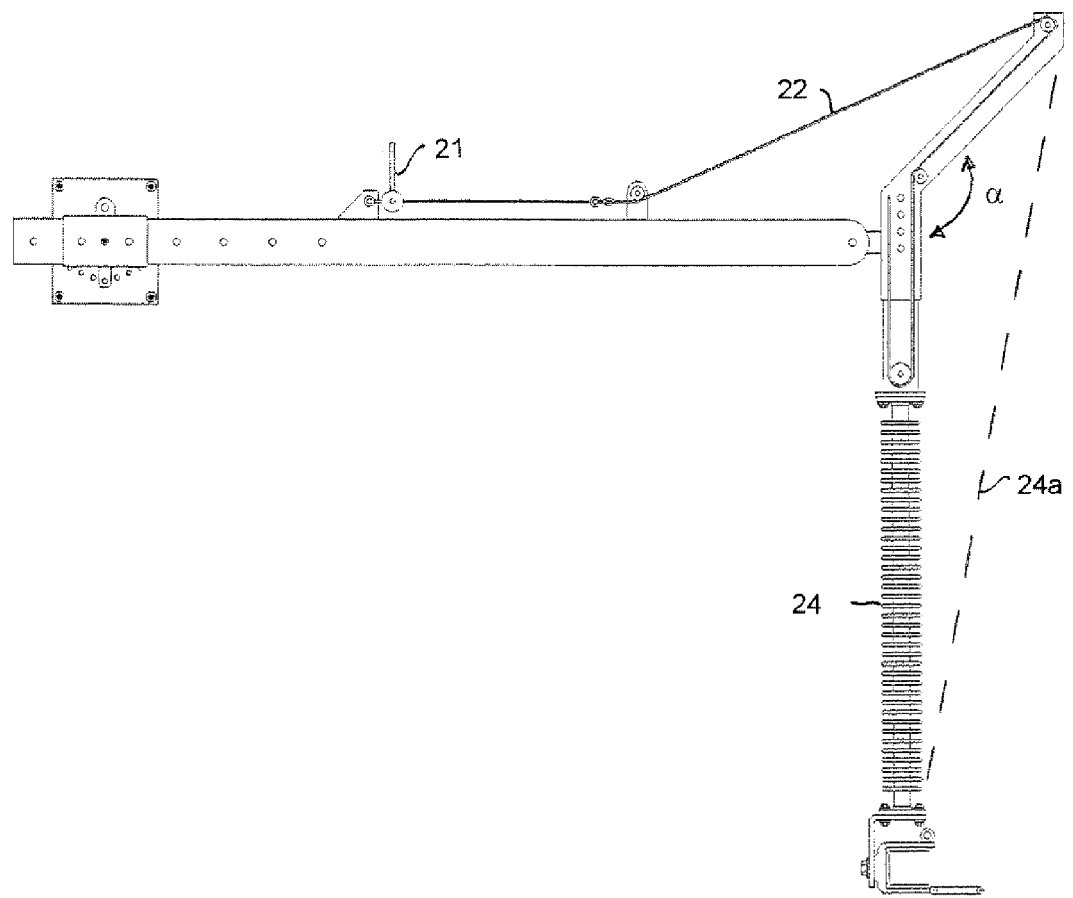
FIG. 7 is an alternative embodiment of the temporary support apparatus according to the present invention illustrating the use of other forms of tensioning devices to rotate the crank arm about the end of the support arm.

In the alternative embodiment of FIG. 7, actuator 20 is replaced with a manual cranking arrangement for example employing winch 21 for tensioning cable 22. In a further alternative embodiment, a static support cable or flexible member 24a is employed in tension between the uppermost end of upper crank arm 16a and the lowermost end of insulator stack 24. Support cable or member 24a serves to support insulator stack 24 as it is rotated about pivot 18 in direction D. Upper portion 16a is angled outwardly by for example an inclined angle a (alpha) of for example approximately 135 degrees, and is sufficiently long, so that tension on cable 22 imparts a moment sufficient to rotate the crank arm, insulator stack, wire holder and conductor in direction D, and so that resulting tension on flexible member 24a supports the insulator stack laterally as its rotated.

The apparatus articulation and extension and retraction could be done using two separate cables and actuators. FIGS. 1-7 indicate a 2:1 mechanical advantage using one pulley; but additional pulleys could be added to lift heavier loads.

Figure 8A:
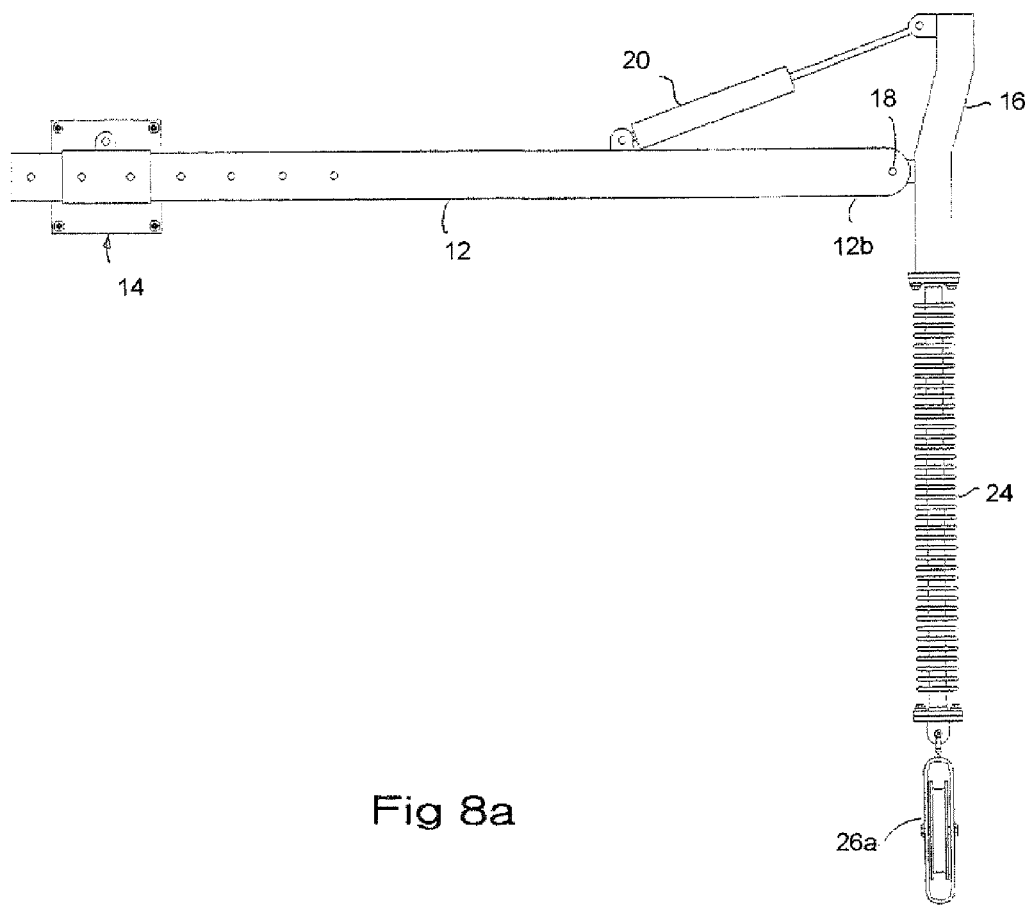
FIG. 8a is, in front elevation view, a further alternative embodiment of the temporary support apparatus according to the present invention illustrating an alternative arrangement of actuator and crank arm, and illustrating the use of a traveller mounted to the lower most end of the insulator in place of the wire holder of FIG. 1.
Figure 8B:
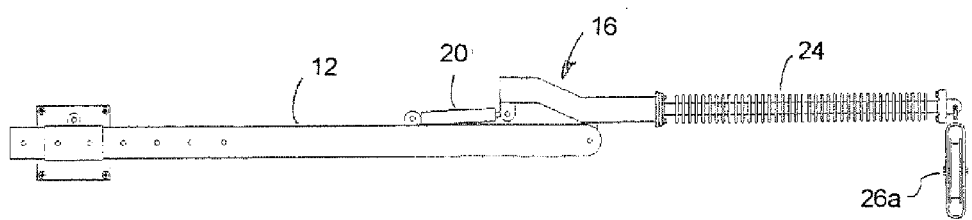
FIG. 8b is, in front elevation view, the embodiment of FIG. 8a once actuated so as to rotate the crank arm about the end of the support arm.
Figure 9A:
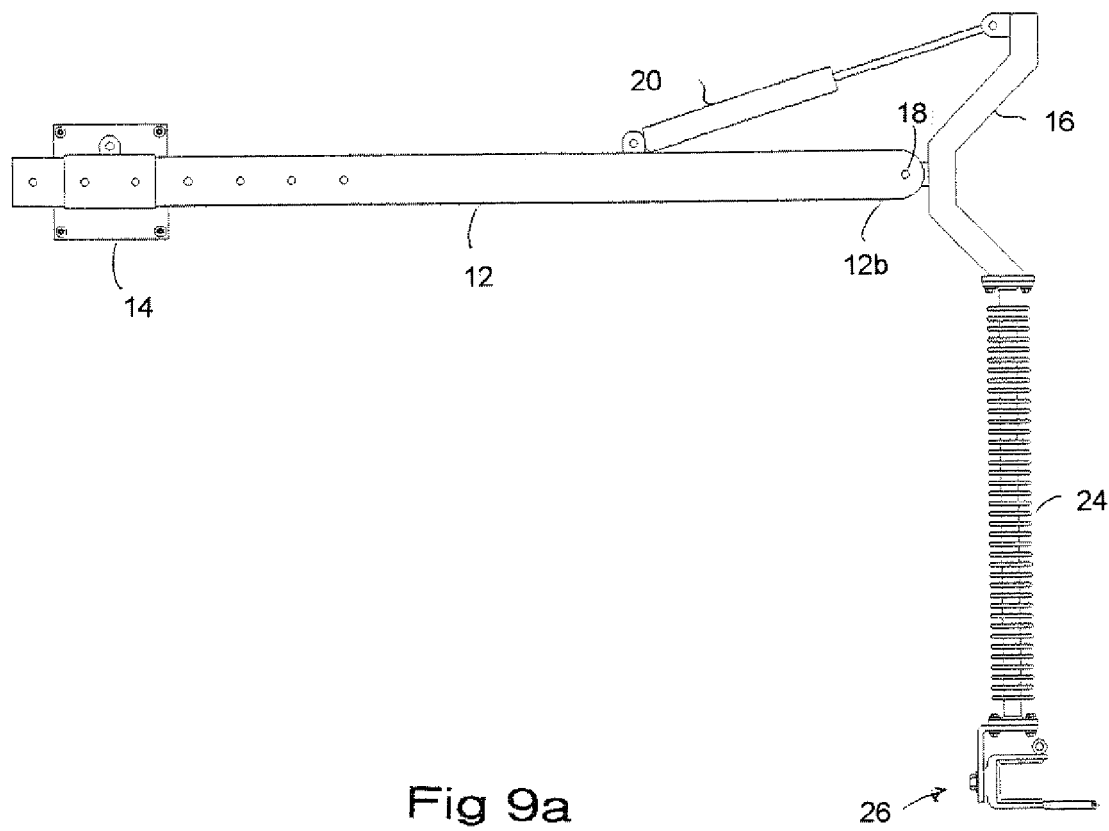
FIG. 9a is a further embodiment of the temporary support apparatus according to the present invention wherein the crank arm provides a laterally outward offset for the insulator relative to the end of the support arm.
Figure 9B:
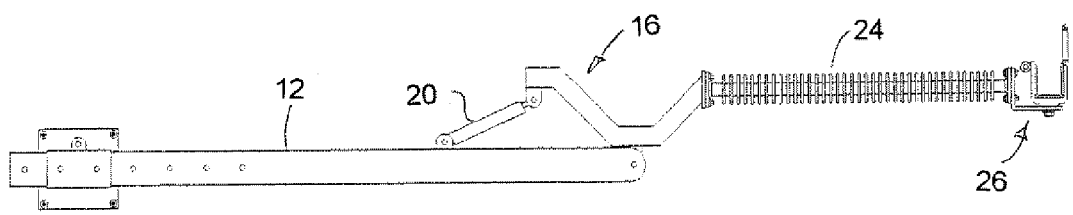
FIG. 9b is the temporary support apparatus of FIG. 9a shown in its fully upwardly rotated position.

In the alternative embodiment of FIGS. 8a, 8b, 9a and 9b, actuator 20 is directly connected to crank arm 16 without the use of cable 22. That is, the prime mover or cylinder of the actuator engages the crank arm directly via the cylinder rod, i.e., the driving member of the cylinder. In FIGS. 8a and 8b, conductor holder 26 is replaced with pulley 26a. As may be seen, crank arm 16 may have more or less offset at its opposite ends relative to pivot 18. In the simplified embodiments of FIGS. 8a and 9a, no mechanism is provided for elevating a lower crank arm portion relative to an upper crank arm portion.

Figure 11A:
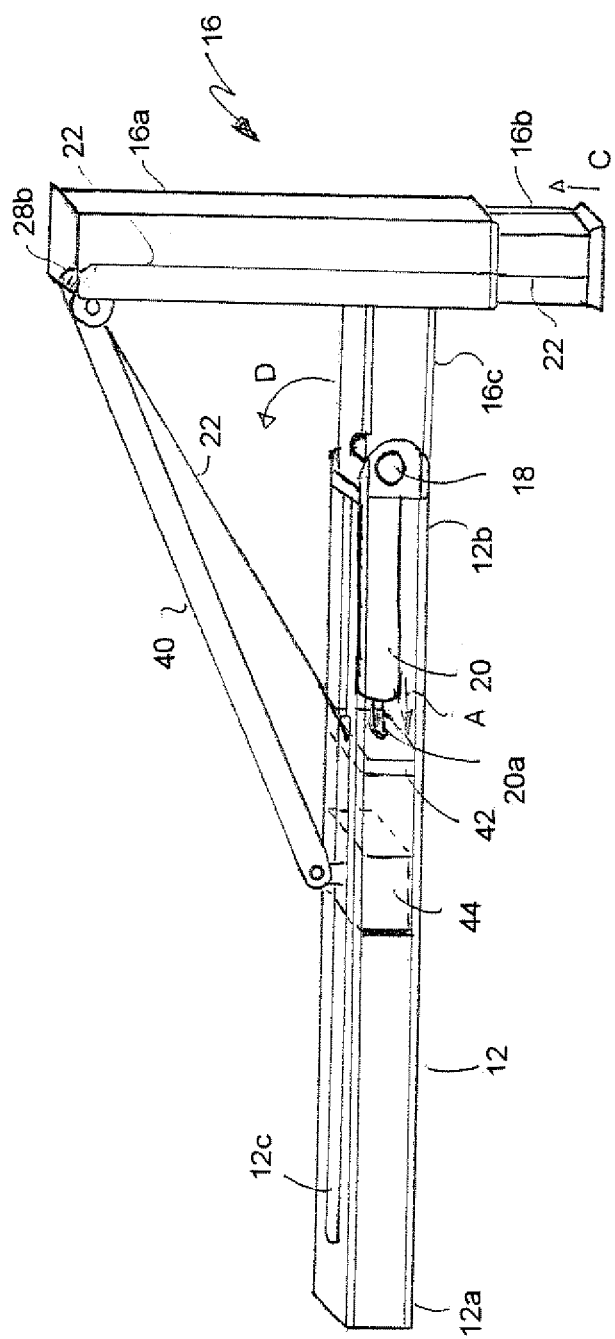
FIG. 11a is, in upper perspective view, a further alternative embodiment of the temporary support apparatus according to the present invention wherein an actuator mounted internally to the support arm translates two stage travellers to produce a corresponding two stage actuation of the crank arm by firstly elevating the lower crank arm and secondly pivoting the entire crank arm so as to rotate the insulator from the vertical to the horizontal.
Figure 11B:
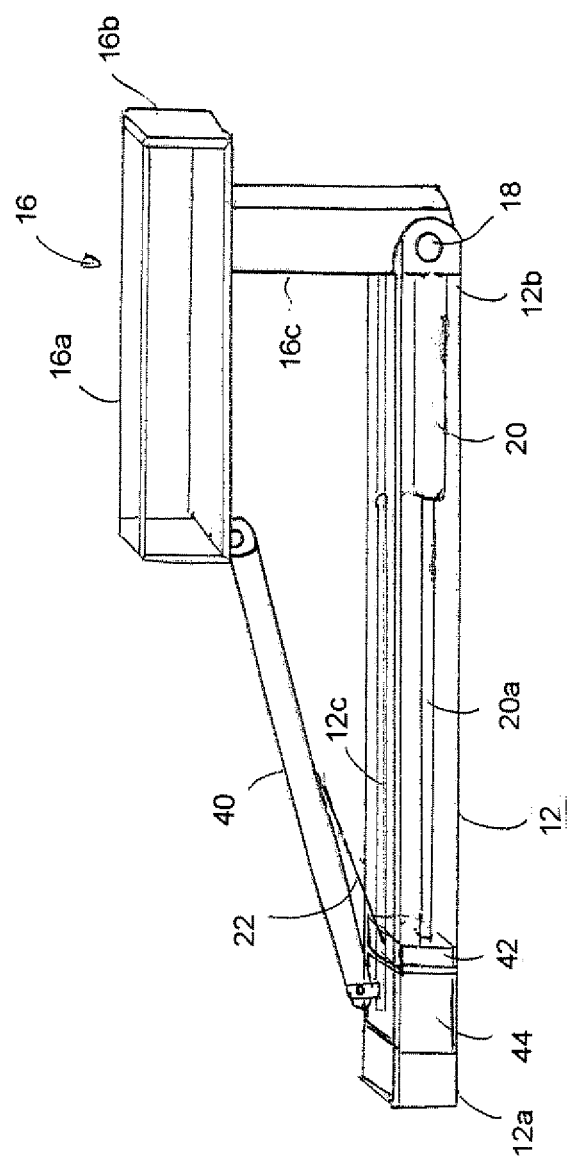
FIG. 11b is the temporary support apparatus of FIG. 11a showing the crank arm having been rotated from the vertical to the horizontal.

In a further alternative embodiment, an internal cylinder or screw device is provided. Tensioning is provided by both a cable and the crank arm, i.e., a rigid linkage. The cable attaches directly to the bottom retractable section where the insulator is attached. The cable comes internally up the crank arm and exits the top of the crank arm where the rigid linkage is attached through a shiv. In a two stage actuation, the cylinder, screw or other actuator takes up the rigid cable the desired distance then contacts the rigid linkage and from that point the linkage and cable move together. Thus as seen in the further alternative embodiment of FIGS. 11a and 11b, actuator 20 is mounted internally within support arm 12 and is oriented for actuation in a reverse direction as compared to the embodiment of FIG. 1. In particular, the driving member or cylinder rod 20a extends from the prime mover or cylinder 20 towards end 12a of the support am so as to translate traveller block 42 also towards end 12a thereby tensioning the flexible member or cable 22. Cable 22 extends upwardly from traveller block 42 and over pulley 28b at the upper end of upper crank arm 16a. Cable 22 extends downwardly within hollow crank arm 16, and in particular downwardly through upper crank arm 16a and lower crank arm 16b to the lower end of lower crank arm 16b where it is a affixed. Thus when rod 20a is extended in direction A from cylinder 20, traveller block 42 is driven towards traveller block 44 within arm 12 thereby tensioning cable 22 and drawing upwardly lower crank arm 16b in direction C. Cable 22 is of sufficient length so that as traveller block 42 engages against traveller block 44, lower crank arm 16b has completed telescopically retracting into upper crank arm 16a. Once traveller block 42 has engaged against traveller block 44, further extension of rod 20a from cylinder 20 pushes both traveller blocks 42 and 44 thereby drawing rigid linkage 40 downwardly and along support arm 12 towards end 12a. Drawing linkage 40 thusly pulls the upper end of upper crank arm 16a over pivot 18 thereby rotating crank arm 16 in direction D from the position shown in FIG. 11a to the fully rotated position shown in FIG. 11b. A conductor 24 mounted to the base of lower crank arm 16b (not shown in FIG. 11a or 11b, but shown in FIGS. 12a and 12b) is rotated from a vertical alignment in FIG. 11a to a horizontal alignment in FIG. 11b thereby rotating for example a conductor holder 26 or a pulley 26a upwardly and out of the way. Thus as seen in FIG. 11b, and although not shown to scale, cylinder rod 20a, when fully extended from cylinder 20, has pushed traveller block 42 and traveller block 44 almost completely to the end of end 12a thereby drawing the lowermost ends of cable 22 and linkage 40 along slot 12c until, at the end of slot 12c, crank arm 16 has been rotated to the horizontal. When it is desired to return crank arm 16 and conductor 24 to the vertical, rod 20a is retracted into cylinder 20 thereby drawing traveller block 42 towards cylinder 20. The weight of insulator 24 acting about pivot 18 causes crank arm to rotate downwardly in a direction opposite to direction D thereby drawing linkage 40 and traveller block 44 along with crank arm 16 so as to translate traveller block 44 also towards cylinder 20.

Figure 12A:
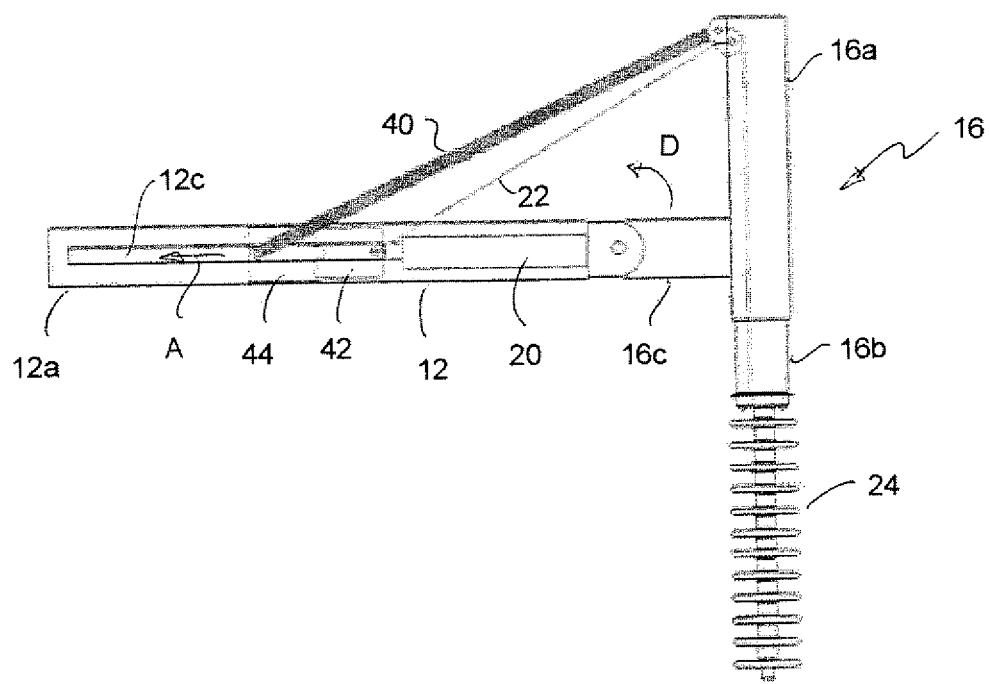
Figure 12B:
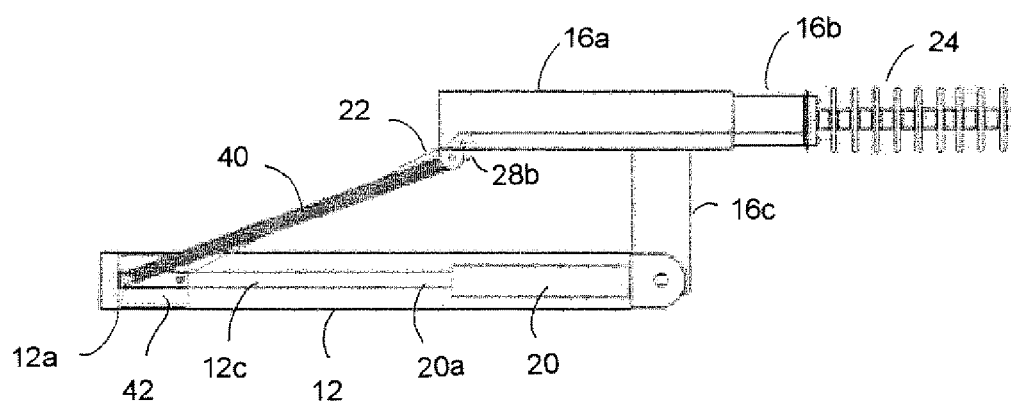
FIG. 12b is the temporary support apparatus of FIG. 12a with the crank arm rotated to the horizontal.

In the alternative embodiment of FIGS. 12a and 12b, a different form of traveller blocks 42 and 44 are illustrated wherein traveller block 42 slides over or alongside so as to overlap traveller block 44. Once traveller block 42 has been slid completely alongside traveller block 44, traveller block 44 is picked up by traveller block 42 so that both traveller blocks then continue sliding along support arm 12 in direction A again thereby drawing the lowermost ends of linkage 40 and cable 22 along slot 12c, wherein, in FIG. 12a, slot 12c is positioned along a side surface of arm 12.

Figure 13A:
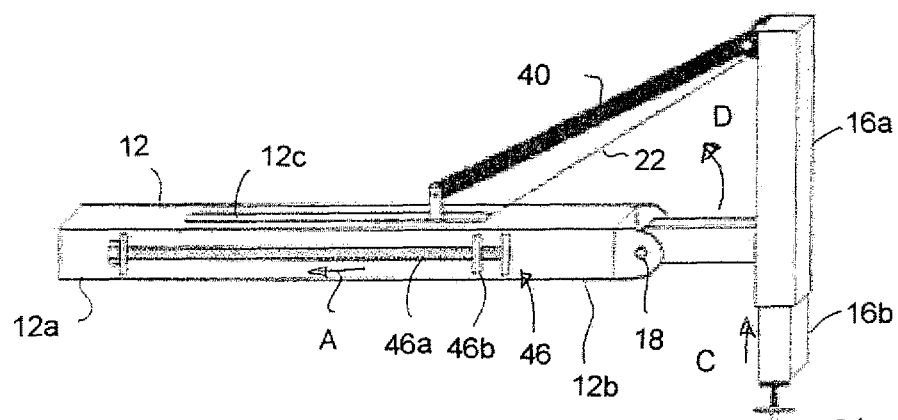
FIG. 13a is a further alternative embodiment of the temporary support apparatus of FIG. 11a wherein the actuator is a helical screw drive.
Figure 13B:
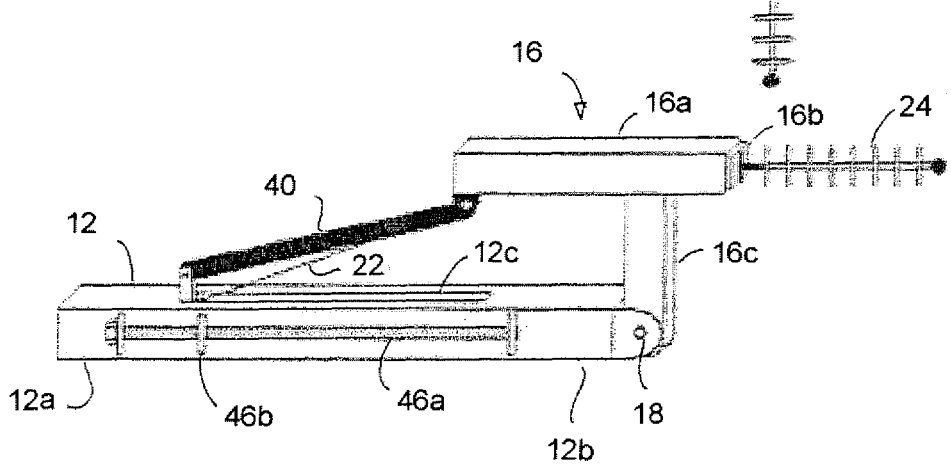
FIG. 13b is the temporary support apparatus of FIG. 13a with the crank arm rotated to the horizontal.

In the further alternative embodiment of FIGS. 13a and 13b, cylinder 20 and corresponding rod 20a are replaced with what is shown diagrammatically as a helical screw drive 46 wherein a motor (not shown) drives rotation of threaded rod 46a thereby conveying a correspondingly threaded follower 46b along threaded rod 46a to once again draw, firstly, cable 22 in direction A to thereby elevate lower crank arm 16b in direction C and, secondly, once cable 22 has been drawn sufficiently along slot 12c, follower 46b engages the traveller 44 corresponding to linkage 40 to thereby simultaneously draw the lower end of linkage 40 also along slot 12c towards end 12c of support arm 12. As before, this rotates crank arm 16 in direction D so as to rotate insulator 24 from the vertical to the horizontal as seen in FIG. 13b.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for providing temporary support for relocating energized electrical conductors comprising:
    an elongate rigid support arm having a base end and an opposite cantilevered end and adapted for mounting at said base end to a conductor tower, wherein said support arm is further adapted for maintaining a substantially horizontal orientation when so mounted to the tower,
    an elongate crank arm pivotally mounted to said cantilevered end of said support arm, said crank arm having an elongate upper portion extending upwardly from said cantilevered end and a lower portion extending downwardly from said upper portion,
    wherein a lower end of said lower portion is adapted for mounting to an upper end of an insulator stack,
    wherein said crank arm is pivotable about said cantilevered end between: (a) a lowered position wherein said lower portion is substantially fully lowered relative to said cantilevered end; and, (b) an elevated position raised from said lowered position, wherein, in said lowered position the insulator stack when mounted on said lower end is substantially vertical, and wherein said pivoting rotation of said crank arm about said cantilevered end so as to rotate said lower portion upwardly from said lowered position also simultaneously rotates the insulator stack to substantially the horizontal,
    an actuator cooperating with an elongate tensioning member extending between said support arm and an upper end of said upper portion of said crank arm, said actuator mounted to said support arm, said tensioning member having opposite first and second ends, said first end of said tensioning member cooperating with said upper end of said crank arm wherein tension applied by said actuator via said tensioning member to said upper end of said crank arm draws said upper end of said crank arm in said pivoting rotation about said cantilevered end towards said support arm to thereby rotate said lower end from said lowered position to said elevated position.

2. The apparatus of claim 1 wherein said first end of said tensioning member cooperates with said lower portion of said crank arm and wherein said lower portion of said crank arm is translatable upwardly relative to said upper portion of said crank arm, and whereby actuation of said actuator elevates said lower portion of said crank arm via said tensioning member.

3. The apparatus of claim 2 wherein said actuation of said actuator which said actuates said upward translation of said lower portion of said crank arm occurs sequentially before said actuation of said pivoting rotation of said crank arm about said cantilevered end.

4. The apparatus of claim 1 further comprising a crank arm rotation inhibitor acting between said crank arm and said support arm to selectively inhibit said pivoting of said crank arm until after said elevating of said lower portion.

5. The apparatus of claim 2 wherein said tensioning member includes a flexible member, and wherein said lower portion is telescopically mounted to said upper portion for relative elevation and lowering of said lower portion relative to said upper portion, and wherein said flexible member has a distal end mounted to said lower portion whereby said tension applied to said tensioning member by said actuator tensions said flexible member thereby elevating said lower portion, and thereby elevating the insulator stack when mounted to said lower portion, when said lower portion is in said lowered position.

6. The application of claim 5 wherein said actuator includes a prime mover mounted to said support arm wherein said flexible member is long enough to pass from said prime mover, around said upper end of said upper portion and down to said lower portion, and wherein said upper end is adapted for said flexible member to pass around said upper end and pass along said upper portion.

7. The apparatus of claim 1 wherein said crank arm includes a height adjustor and is selectively positionable relative to said support arm by said height adjustor so as to selectively position the wire holder mounted thereon, when the insulator stack is mounted on the lower end to be adjacent a conductor to be picked and elevated.

8. The apparatus of claim 7 wherein an adjustable mounting bracket is mounted between said cantilevered end and said crank arm, and wherein said mounting bracket is adjustable so as to said selectively position said crank arm relative to said support arm.

9. The apparatus of claim 6 wherein said upper end includes a pulley over which said flexible member passes.

10. The apparatus of claim 9 wherein said flexible member includes a cable.

11. The apparatus of claim 1 wherein said upper portion of said crank arm is inclined relative to said lower portion of said crank arm so as to extend said upper end of said upper portion outwardly of said cantilevered end and said lower portion.

12. The apparatus of claim 3 wherein said upper portion is substantially linear and said lower portion is substantially linear.

13. The apparatus of claim 1 wherein said upper and lower portions of said crank arm are telescopically mounted to one another.

14. The apparatus of claim 6 wherein a driving member is mounted to said prime mover, and wherein a base end of said flexible member, opposite said distal end of said flexible member, is tensioned by said driving member upon said actuation of said actuator, to thereby said tension said flexible member.

15. The apparatus of claim 14 wherein said tensioning member further includes a second member alongside at least said base end of said flexible member, said second member having a base end cooperating with said driving member and an opposite distal end pivotably affixed to said upper end of said upper portion of said crank arm, and wherein said driving member, upon said actuation, sequentially engages said base ends of said flexible member and said second member to sequentially said elevate said lower portion of said crank arm and said pivotably rotate of said crank arm.

16. The apparatus of claim 15 wherein said second member is a rigid linkage member.

17. A method for providing temporary support for relocating energized electrical conductors comprising the steps of:
a) providing an elongate rigid support arm adapted for mounting at a base end thereof to a conductor tower, wherein said support arm is further adapted for maintaining a substantially horizontal orientation when so mounted to the tower, an elongate crank arm pivotally mounted to a cantilevered end of said support arm distal from said crank arm has an elongate upper portion extending upwardly from said cantilevered end and a lower portion extending downwardly from said upper portion,
wherein a lower end of said lower portion is adapted for mounting of an upper end of an insulator stack thereto,
wherein said crank arm is pivotable about said cantilevered end between: (a) a lowered position wherein said lower portion is substantially fully lowered relative to said cantilevered end; and, (b) an elevated position raised from said lowered position, wherein, in said lowered position the insulator stack when mounted on said lower end is substantially vertical, and wherein rotation of said crank arm so as to rotate said lower portion upwardly from said lowered position simultaneously also rotates the insulator stack to thereby elevate and translate upwardly a conductor holder end of the insulator stack,
an actuator cooperating with an elongate tensioning member extending between said support arm and an upper end of said upper portion of said crank arm, said actuator mounted to said support arm, said tensioning member having opposite first and second ends, said first end of said tensioning member cooperating with said upper end of said crank arm wherein tension applied by said actuator to said upper end of said crank arm draws said upper end of said crank arm in said pivoting rotation about said cantilevered end towards said support arm to thereby rotate said lower end from said lowered position to said elevated position,
b) mounting the insulator stack so as to depend from said lower end of said lower portion,
c) mounting said support arm substantially horizontally to the tower and positioning the conductor holder end of the insulator stack adjacent the electrical conductor held in a second insulator stack, the second insulator stack being the insulator stack to be maintained or replaced,
d) capturing the conductor on the conductor holder end of the insulator stack,
e) actuating said actuator to apply tension to said tensioning member and to thereby relieve loading by the conductor of the wire holder of the second insulator stack, and removing the conductor therefrom,
f) continuing said actuation of said actuator and corresponding tensioning of said tensioning member to rotate said crank arm to rotate said lower portion into said elevated position to thereby carry the conductor away from the second insulator stack.

18. The method of claim 17 further comprising providing the apparatus of claim 2 and further comprising providing a crank arm rotation inhibitor acting between said crank arm and said support arm to selectively inhibit said pivoting of said crank arm until after said elevating of said lower portioning, and selectively engaging said rotation inhibitor until at least substantially after said elevating of said lower portion.

19. The method of claim 17 further comprising providing the apparatus of claim 2 and sequentially elevating said lower portion of said crank arm and then rotating said crank arm to said elevated position.

* * * * *